CYLINDER-TYPE TALKING MECHANISM

Filed Feb. 6, 1967 2 Sheets-Sheet 1

INVENTOR.
KENNETH W. LINDSAY
BURT W. ENSMANN
BY
Amster & Rothstein
ATTORNEYS

INVENTOR
KENNETH W. LINDSAY
BURT W. ENSMANN
BY Amster & Rothstein
ATTORNEYS

United States Patent Office 3,477,728
Patented Nov. 11, 1969

3,477,728
CYLINDER-TYPE TALKING MECHANISM
Kenneth W. Lindsay, Great Neck, and Burt W. Ensmann, Jamaica, N.Y., assignors to Ideal Toy Corporation, Hollis, N.Y., a corporation of New York
Filed Feb. 6, 1967, Ser. No. 614,126
Int. Cl. G11b *15/40*
U.S. Cl. 274—1.1 9 Claims

ABSTRACT OF THE DISCLOSURE

A cylinder-type talking mechanism for use in dolls and the like. A stylus engages interleaved grooves on a record cylinder to provide random playback of the corresponding sound sequences. Although the cylinder is biased against the stylus, between playing intervals the pull ring attached to the free end of the pull string bears against the doll body to pull the cylinder away from the stylus. This permits the stylus to return to its initial position, out of contact with the cylinder, at the termination of each playing interval. A constant speed governor is mounted on the same shaft with the record cylinder to permit a compact size. Also, a clutch is provided on the same shaft to prevent rotation of the record cylinder during wind-up. The clutch is included within the record cylinder to further reduce the size of the overall mechanism.

This invention relates to audio devices for use in dolls, toys and the like, and more particularly to a miniature cylinder-type phonograph which is capable of producing randomly any one of a number of different audio sequences.

It has long been known to have a record disc having recorded thereon a plurality of discrete sound sequences all starting at the same starting position contiguous to the outer edge of the record and spiraling towards the center thereof in interleaved fashion. With this type of record, depending upon the rotational orientation of the record disc relative to the stylus when the latter is set down contiguous to the outer edge of the record, one of the plural sound sequences is played back. Of more recent times, a smaller version of this so-called multi-groove disc has been incorporated in a phonograph device for use in various types of toys, including dolls. Such phonograph device, which is likewise old and well known, includes a stylus mounted on a stylus arm arranged to track a sound groove on the record disc. Stylus movement in turn is converted into an audible reproduction of the sound sequence by coupling the stylus to a speaker. The record disc is turned at the required speed, as by the provision of a spring motor, which may be loaded by a drawstring. A governor is provided in such phonograph mechanisms to assure constant speed turning of the record disc to achieve the desired playback of the sound sequence recorded thereon. When such multi-groove record disc is embodied in a drawingstring-operated phonograph device, any one of the plurality of discrete sound sequences can be played, either on a random basis or in a particular order. Recently, such devices have also been adapted for drive by a smaller fractional horsepower motor operated from one or more batteries. However, whether incorporating a manually-actuated spring motor or a battery-operated electric motor, such devices are of such size that they cannot be incorporated into realtively small toys and dolls. There exists a need for phonograph mechanisms which are of a size such that they can be incorporated into relatively small toys including, without limitation, so-called twelve inch fashion dolls. Such phonograph mechanisms should be capable of being manufactured at relatively low unit cost and should be of exceptionally reliable and rugged construction to tolerate repeated use, and to some extent abuse, as is occasioned with many toys.

Broadly, it is an object of the present invention to provide an improved audio device which realizes one or more of the aforesaid objectives. Specifically, it is within the contemplation of the present invention to provide a miniature phonograph which is capable of playing one of a plurality of discrete sound sequences and is suitable for manufacture at a relatively low unit cost.

In the co-pending application of Kenneth W. Lindsay, Ser. No. 460,738, filed June 2, 1965, there is disclosed an audio device which satisfies the various requirements enumerated above. The Lindsay audio device comprises an axially rotatable record cylinder mounted on a support for rotation and for movement into and out of a playing position. Sound-reproducing means are arranged to engage the record cylinder in the playing position. An actuating assembly is provided which includes a spring adapted to be wound onto a spring-receiving capstan operatively connected to the record cylinder. A string-receiving pulley is operatively connected to the record cylinder and a pull string is wound on the pulley and arranged to move the record cylinder out of the playing position and to wind at least a portion of the spring onto the capstan. The record cylinder is arranged to be restored to the playing position upon release of the pull string; and the spring itself is effective during rewind to rotate the record cylinder for a prescribed playing interval. Preferably, the record cylinder has a plurality of circumferentially extending record grooves which are interleaved with each other, with each of the record grooves having an independent entry end circumferentially spaced about one end of the record cylinder and an exit end at the other end of the record cylinder. Accordingly, the sound-reproducing means may track any one of the plural record grooves for playback of the corresponding sound sequence.

Although the Lindsay device is a substantial improvement over those previously available, there is yet a need for even smaller phonograph mechanisms.

Another shortcoming of prior art mechanisms is their incorporation of relatively bulky and complex governors. A governor is generally required to assure constant speed rotation of the cylinder. Heretofore, considerable difficulty has been encountered in providing miniature yet effective governors in talking doll mechanisms.

It is another object of this invention to provide a simply-constructed governor mechanism on the same shaft with the record cylinder.

In accordance with the principles of our invention a single shaft is provided to carry a string-receiving pulley, a spring capstan, an axially rotatable record cylinder and a governor mechanism. A spring coil clutch connects the record cylinder to the spring capstan. When the string is pulled the capstan is rotated and a spring is wound around it. During the wind-up the clutch mechanism does not control rotation of the record cylinder. When the string is released the string rewinds to rotate the capstan. At this time the clutch is effective to rotate the record cylinder. The record cylinder has a plurality of circumferentially extending record grooves which are interleaved with each other, with each of the record grooves having an independent entry end circumferentially spaced about one end of the cylinder and an exit end at the other end of the cylinder. A stylus tracks any one of the plural record grooves for playback of the corresponding sound sequence.

A spring bias is provided to force the record cylinder (and the other elements on the same shaft) toward the stylus. The free end of the pullstring is attached to a pullring. Although the record cylinder is biased toward the stylus, when the string is wound up on the string-receiving pulley the record cylinder shaft is held away from the stylus by the pullring bearing against the doll body. After a wind-up operation followed by the release of the string, the record cylinder shaft springs up toward the stylus. At this time the stylus moves between the cylinder and the speaker assembly to provide playback. During playback the string winds up against on the pulley. When the pullring hits the doll body the record cylinder shaft once again is pulled away from the stylus. In the absence of contact between the stylus and the cylinder the stylus returns to its starting position. Thus, in our invention, between playing operations the stylus is at its starting position and does not make contact with the record cylinder.

It is a feature of this invention to provide on a single shaft a string-receiving pulley, a spring-receiving capstan, a record cylinder and a governor.

It is a further feature of this invention to utilize the pullring attached to the free end of the pullstring to prevent contact between the stylus and the record cylinder between playing intervals.

Further objects, features and advantages of our invention will become apparent upon consideration of the following detailed description, in conjunction with the drawing in which.

Figure 1:
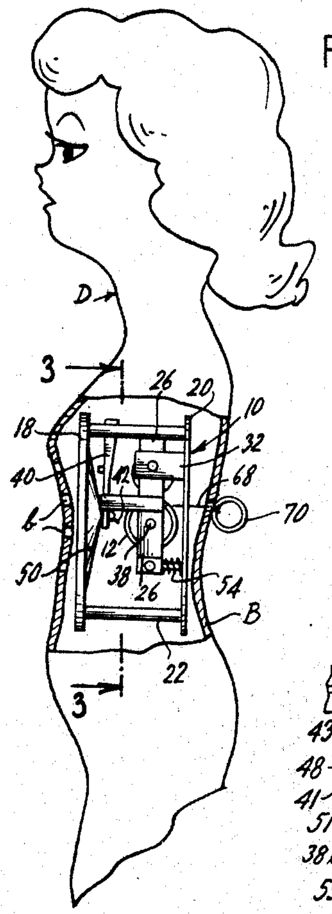
FIG. 1 is an elevational view, wtih parts broken away and in section, showing an audio device in accordance with the present invention mounted within a typical fashion doll.
Figure 2:
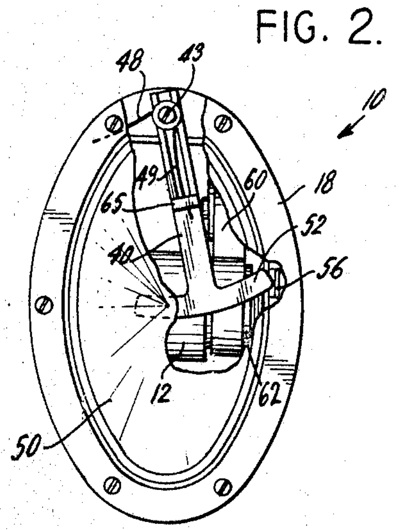
FIG. 2 is a front elevational view of the audio device, with parts broken away to show the internal construction thereof.

Referring now specifically to the drawings, and in particular to FIG. 1, there is shown an audio playback device, generally designated by the reference numeral 10, which embodies features of the present invention and has been mounted in a typical doll D. The audio device 10 may be mounted within the doll D in any convenient fashion, as for example by having the audio device completely self-contained on its own support, as illustrated, or by actually employing the doll body B as the only physical support for the audio device. In the latter instance, the doll body B is constructed of at least two parts to facilitate the initial mounting and assembly of the audio device therein.

In FIG. 1 stylus 42 is shown out of contact with record cylinder 12. To wind up the device ring 70 is pulled and string 68 is withdrawn from the doll. During playback the string is wound up on a string-receiving pulley in the audio device. At the same time record cylinder 12 is biased against stylus 42. When the string is fully wound up ring 70 abuts against the back of the doll body. At this time the record cylinder is pulled away from stylus 42. As will become apparent below, for proper operation of the audio device the length of string 68 between ring 70 and its point of attachment to the string-receiving pulley is a design characteristic of the device. In the remaining figures of the drawing ring 70 is shown abutting base plate 20 in the non-playing position. The operation is the same however if the string in FIGS. 2–8 is shorter than the string in FIG. 1 by the distance between base plate 20 and the back of the doll. Accordingly, although the following description is directed primarily to FIGS. 2–8 it is to be understood that if the audio device is incorporated in the doll body the string may be made slightly longer to insure that in all cases the same length of string is wound around the string-receiving pulley in the non-playing position.

The device 10 includes an axially-rotatable record cylinder 12 (see FIG. 6) which has a peripheral record surface 12*a* formed with a plurality of record grooves 14 cut thereon. In this illustrative embodiment, the record cylinder has a number of circumferentially extending interleaved record grooves, the grooves or tracks 14 each having an independent entry end (i.e., entry end 14*a*) at one end of the record cylinder, which are disposed at successive spaced locations about the circumference of the record cylinder, and an independent exit end. Attached to base plate 20 are two brackets 32 and 33. At the top of each of these brackets is a hole through which one of respective pivots 34 and 35 passes. (See FIG. 3.) Each of the pivots is in turn attached to a respective one of the yoke sections 24 and 26. The two yoke sections are joined at their ends as shown. The entire yoke assembly can thus move on pivots 34 and 35.

The yoke assembly carries shaft 38. The shaft is rigidly secured to the yoke and cannot rotate relative thereto. One end of the shaft is welded to yoke 26 as shown at 21. A governor housing 74 is welded to yoke 24 and shaft 38 is in turn welded to the exterior of the housing as shown at 23. Yoke 24 is provided with a circular cutout for containing rotor 76 and gear 84.

Figure 4:
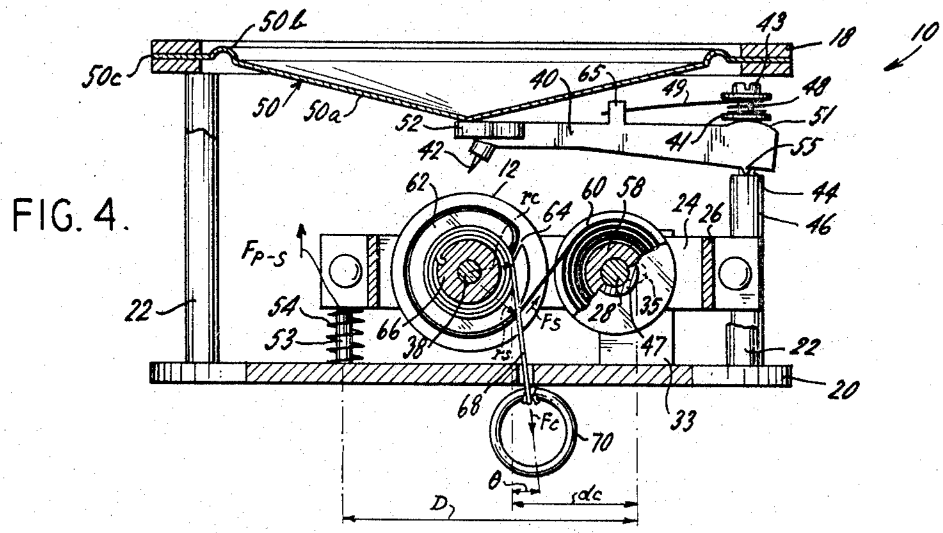
FIG. 4 is a side elevational view, with parts broken away, taken through the line 4—4 of FIG. 3 and depicts the record cylinder in the non-playing position.

Three independent and freely rotatable mechanisms are disposed on shaft 38. The first mechanism includes a spring-receiving capstan 62 and a string-receiving pulley 66. The assembly is an integral unit and includes a circular end plate 61 for guiding the winding of string 68 on the pulley. Clock spring 60 is anchored on capstan 62 as shown in FIG. 4 at 64. Capstan 62 is provided with a hole 73 parallel with shaft 38. The diameter of the bore of pulley 66 and capstan 62 is slightly larger than the diameter of shaft 38 to permit free rotation thereabout.

The second independent assembly consists of the record cylinder drum unit and gear 80. Cylinder 63 is joined directly to gear 80, and record cylinder supporting drum 15 is attached to the cylinder by internal flange 57. The internal bore of cylinder 63 is slightly larger than the diameter of shaft 38. Gear 80 and record cylinder drum 15 are thus also freely rotatable about the shaft. The record cylinder itself is a sleeve 12 which is fitted over drum or arbor 15. The use of separate units rather than an integral record cylinder drum permits the interchange of various sound sleeves during manufacture.

Figures 3, 7, 8:
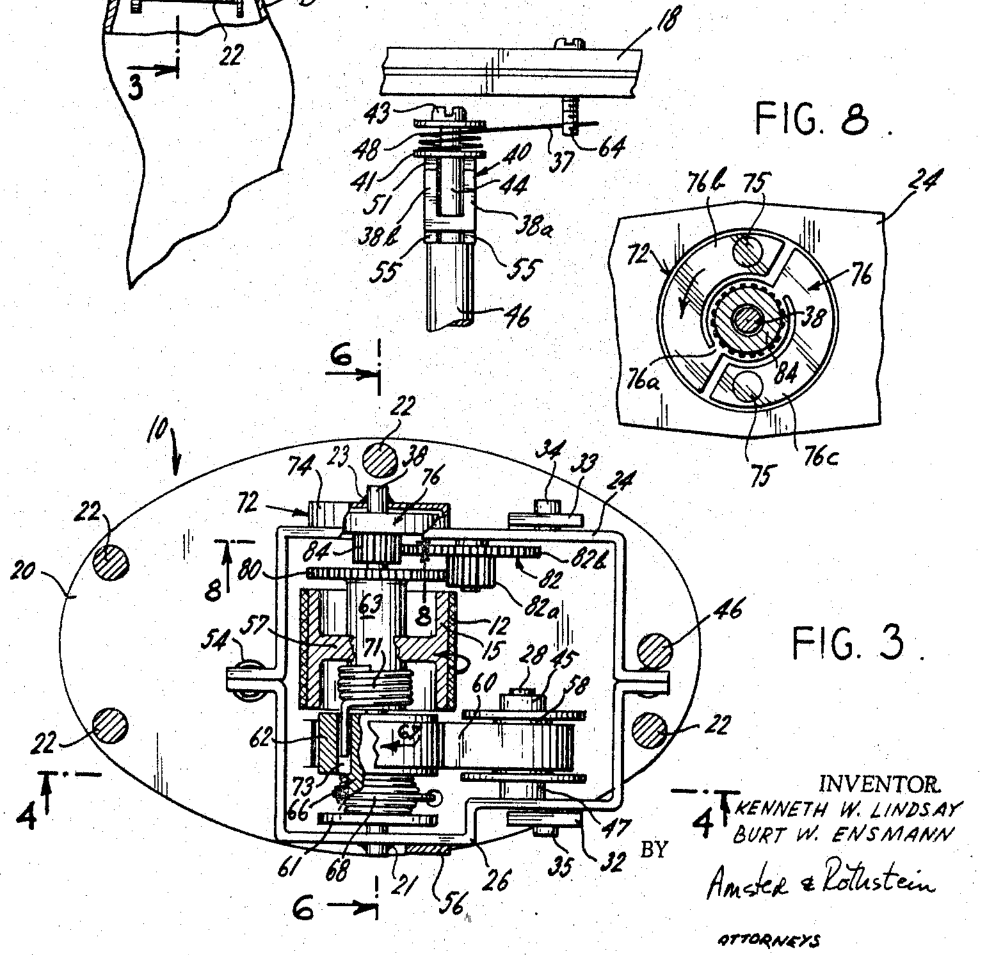
FIG. 3 is a front elevational view, similar to FIG. 2 but on an enlarged scale, with the front support removed to show the internal construction of the audio device.
FIG. 7 shows in detail the mounting of the stylus arm.
FIG. 8 is a sectional view taken along the line 8—8 of FIG. 3 showing the governor mechanism.

Capstan 62 and cylinder 63 are interconnected by coil spring 71. The inner diameter of the coil is slightly smaller than the outer diameter of cylinder 63 and the coil thus sits relatively tightly on the cylinder. One end of the coil spring is bent as shown in FIG. 3 and inserted into hole 73 of capstan 62. As will be described below, coil spring 71 is the clutch which enables movement of record cylinder 12 and the various gears only during playback operations.

The third independent assembly on shaft 38 consists of integrally connected rotor 76 and gear 84. This integral assembly is also freely rotatable about shaft 38. The rotor itself is shown more clearly in FIG. 8 which depicts governor mechanism 72. It includes a central web 76*a* and oppositely directed shoes 76*b*, 76*c*. As the rotor and gear 84 are rotated about shaft 38 the shoes are forced in an outward direction and bear against the inner surface of housing 74. Gear 84 is connected to gear 80 by member 82 which includes the integrally connected gears 82a and 82b, as seen most clearly in FIG. 3. The rotation of record cylinder 12 thus results in the rotation of rotor 76. The greater the speed of the cylinder, the greater is the speed of the rotor and the pressure of shoes 76b and 76c against the housing. This greater pressure in turn slows up the speed of the rotor and record cylinder. The governor assembly thus regulates the speed at which record cylinder 12 is driven. As will be described below the record cylinder is driven by clock spring 60. Although the tendency of the spring is to turn the record cylinder at a progressively changing speed, the governor insures that the record cylinder rotates at a relatively constant rate. If the rotor is made of a plastic material the centrifugal force developed may be insufficient to produce adequate pressure against the housing. For this reason relatively heavy metal weights 75 may be secured to the rotor shoes as shown in FIG. 8 to develop the necessary pressure.

Before proceeding with the description of the stylus assembly and the movement of yoke 24, 26 about pivots 34, 35, it will be most convenient to consider the actuation of record cylinder 12. The system is shown in its rest position in FIG. 4. Drum 58, with side flanges 45 and 47, is attached to and rotatable about shaft 28. Spring 60 for the most part is wound around drum 58 and tends to turn capstan 62 in a counter-clockwise direction. However, turning of the capstan is prevented by pullring 70 attached to string 68. Turning of the capstan in the counter-clockwise direction during playback causes string 68 to be drawn into the talking mechanism as it is wound around string-receiving pulley 66. After playback further pulling in of the string is prevented by ring 70 abutting against plate 20.

When the ring is pulled during wind-up and string 68 drawn out of the talking mechanism, pulley 66 and capstan 62 rotate in the clockwise direction. Spring 60 thus winds up on capstan 62. When pullring 70 is released clock spring 60 rewinds on drum 58. In so doing, capstan 62 and string-receiving pulley 66 rotate in the counter-clockwise direction. The string once again winds up on pulley 66. Thus capstan 62 rotates during both playback and wind-up operations.

However, record cylinder 12 rotates only during playback. Referring to FIG. 3 arrow 67 shows the direction of movement of spring 60 during playback. As the capstan rotates it causes coil spring 71 to move with it since the bent end of the spring is inserted in hole 73 of the capstan Rotation of spring 71 in the direction of arrow 67 results in tne rotation of cylinder 63, which in turn forces record cylinder 12, the gear train and rotor 76 to move with it. During wind-up, however, the coil spring rotates in the direction opposite to that shown by arrow 67. This results in a slight unwinding of coil 71 and a slight increase in its inner diameter. The coil does not grip cylinder 63 and the record cylinder does not rotate. Coil spring 71 thus serves in the capacity of a clutch and prevents unnecessary wear of the moving parts in the talking mechanism.

A sound-reproducing mechanism is arranged to coact with the record cylinder in the playing position to play back any one of the discrete sound sequences of the grooves or tracks 14. In the illustrative embodiment of the invention, the record is cut on the hill-and-dale system. Accordingly, the sound-reproducing mechanism includes a stylus arm 40 having a stylus 42 which is capable of tracking the record grooves essentially parallel to the axis of record cylinder 12. Stylus arm 40 is loosely mounted such that the stylus can track the record grooves. Although FIGS. 4 and 6 show record cylinder 12 in the non-playing position, it will be convenient for the moment to consider these two figures as if the record cylinder were raised slightly to the playing position of FIG. 5. Considering the three figures together, it is seen that the rearward end of stylus arm 40 is provided with an oversized hole 40a which is received on an upstanding mounting pivot 44 which in turn is supported on a stylus post 46. On top of stylus arm 40 and mounted on pivot 44 is a sleeve 41 on which spring 48 is mounted. Cap 43 is attached to pivot 44 on top of spring 48. The spring end 49 biases stylus arm 40 in an upward direction such that transverse member 52 makes contact with speaker cone 50. The rear of stylus arm 40 is provided with a rounded head 51 and two V-shaped downward projections 55. The stylus arm thus makes point contacts with post 46 for minimum friction.

Figure 5:
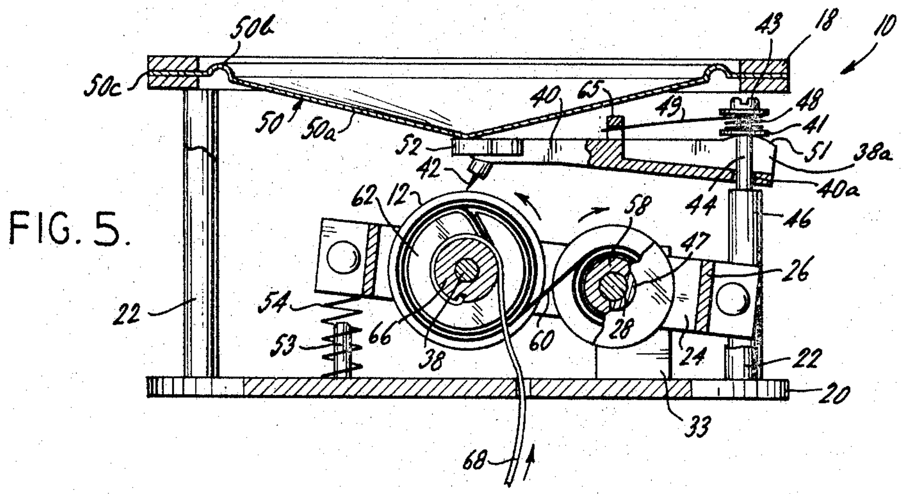
FIG. 5 is a side elevational view similar to FIG. 4 showing the record cylinder in a playing position engaged by the stylus for playback.
Figure 6:
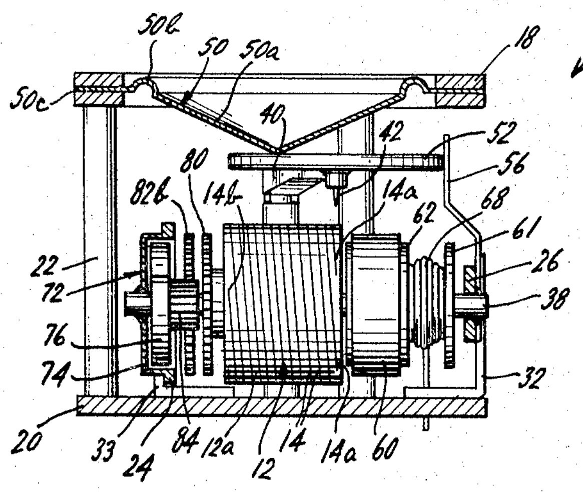
FIG. 6 is a sectional view taken along the line 6—6 of FIG. 3 showing the record cylinder in the non-playing position.

Referring to FIG. 5 it is apparent that oversized hole 40a permits the stylus to move up and down slightly as it tracks the record grooves. While up and down movement is necessary, twisting of the stylus arm should be prevented. Referring to FIG. 6 (and still assuming that cylinder 12 is raised to the playing position) it is seen that motion-transmitting member 52, attached to the front end of the stylus arm and in a direction approximately perpendicular thereto, slidably connects stylus 42 to speaker assembly 50 over the entire traverse of the stylus arm. At the beginning of the playback operation the forces on member 52 tend to rotate it in a counter-clockwise direction. In the latter part of the playback operation the forces tend to rotate member 52 in the clockwise direction. Rotations of both types are prevented by providing stylus arm 40 with two rear parallel sides 38a, 38b spaced an amount equal to the diameter of mounting pivot 44. The mounting pivot extends through hole 40a up between the two stylus arm sides 38a, 38b, as shown in FIGS. 5–7. Since the two sides fit snugly around pivot 44, although up and down movement of the stylus on the mounting pivot is permitted, no twisting can occur. In this manner motion-transmitting member 52 remains parallel with the axis of cylinder 12 at all times.

As described above, spring 48 serves to bias stylus arm 40 in an upward direction to maintain constant contact between transverse member 52 and speaker 50. The spring also serves to return the stylus arm to the initial position shown in FIG. 6. As seen in FIG. 7, end 37 of the spring is mounted against screw 64 in upper plate 18. The other end 49 of the spring (see FIGS. 4 and 5) bears against abutment 65 on the stylus arm. As the stylus moves to the left in FIG. 6 while tracking a record groove, the two ends of the spring are forced apart from each other. Although this creates a spring force tending to return the stylus arm to the initial position, as long as the stylus is in contact with a record groove it tracks the groove as cylinder 12 rotates. The force of the record groove against the stylus causes it to continue to move to the left (still assuming that cylinder 12 in FIG. 6 is raised to the playing position). After the playing interval, when cylinder 12 is lowered, spring 48 forces the stylus arm to return to its initial position as shown in FIG. 6. Stop 56, attached to yoke 26, positions stylus 42 at the starting end of the record cylinder. The stop is positioned such that when the rightmost end of motion-transmitting member 52 is in contact with it, stylus 42 is above the starting end of the record cylinder.

Speaker assembly 50 is made of vacuum-formed plastic and includes a cone section 50a formed integrally with a ridge 50b and suspending diaphragm 50c. Diaphragm 50c is mounted on upper plate 18, which in turn is attached to base 20 by four posts 22. Ridge 50b (more than one may be provided if desired) permits flexibility of cone 50a for maximum fidelity. Although motion-transmitting member 52 is in contact with the tip of cone 50a at all times, sound is heard from the speaker assembly only when cylinder 12 is raised and stylus 42 tracks one of the grooves thereon.

Referring to FIG. 5 it will be seen that there is provided a post 53 on which spring 54 is mounted. The spring forces yoke 24, 26 in an upward direction as shown in the drawing, with the yoke assembly moving in the clockwise direction about pivots 34 and 35. It is the spring, during the playing interval, that forces record cylinder 12 into contact with stylus 42.

During playback string 68 is drawn into the device as shown in FIG. 5. At the end of playback ring 70 abuts against plate 20 as shown in FIG. 4. At this time various forces are developed which cause yoke 24, 26 to be pulled against spring 54. The spring is compressed and record cylinder 12 is moved out of contact with stylus 42, permitting stylus arm 40 to return to its starting position.

After playback spring 60 is not completely wound up on cylinder 58, a small portion of the spring remaining on capstan 62. The spring thus tends to rotate capstan 62 and string-receiving pulley 66 further in the counter-clockwise direction. Further counter-clockwise rotation results in further winding up of string 68 on pulley 66 since string 68 and spring 60 are wound about shaft 38 in opposite directions. The string cannot be further drawn in because ring 70 abuts against plate 20. The net result is that yoke 24, 26 is pulled down against spring 53.

The over-all operation can be expressed mathematically. Assume that the tension force in spring 60 has a magnitude $F_s$ in the direction shown in FIG. 4, and the tension force in string 68 has a magnitude $F_c$ in the direction shown (it is the force $F_c$ which pulls yoke 24, 26 toward base 20). String 68 makes an angle $\theta$ with respect to a line drawn perpendicular to base 20. Force $F_c$ is at the same angle. Force $F_{p-s}$ represents the combined forces of post 53 and spring 54 against the forward end of the yoke assembly and is in an upward direction as shown in the drawing. The various dimensions shown in FIG. 4 are as follows: $r_c$ represents the distance from the center of shaft 38 to the point where string 68 is tangent to the coils of string wound on pulley 66, and $r_s$ represents a similar radial dimension for spring 60. D represents the distance of the center of spring 54 and post 53 from pivots 34, 35; and $d_c$ represents the distance of string 68 at its tangent point from pivots 34, 35.

Since capstan 62 and pulley 66 are not in motion between playing intervals, the clockwise and counter-clockwise moments about shaft 38 must be equal:

$$F_s r_s = F_c r_c \quad (1)$$

Also, since yoke 24, 26 is at a rest position the moments about pivots 34, 35 must cancel:

$$F_{p-s} D = F_c (\cos\theta) d_c \quad (2)$$

Equation 1 enables the force exerted by string 68 (and ring 70) in pulling yoke 24, 26 down toward base 20 to be expressed in terms of the spring force, $F_s$:

$$F_c = F_s (r_s / r_c) \quad (3)$$

Substituting Equation 3 in Equation 2, the post-spring force, $F_{p-s}$, may be derived:

$$F_{p-s} = F_s (r_s / r_c)(\cos\theta)(d_c / D) \quad (4)$$

As spring 60 rewinds on cylinder 58 during playback, string 68 is drawn into the audio device. When ring 70 hits base 22, the string can no longer be pulled into the mechanism. However, spring 60 continues to rewind on cylinder 58 and pulley 66 continues to rotate in the counter-clockwise direction. String 68 thus continues to wind up on pulley 66, but since no more string can be pulled into the device pulley 66 and all other elements on shaft 38 are pulled down against base 20. This motion continues until yoke 24, 26 is inhibited from further movement by contact with post 53. As cylinder 12 starts its movement toward base 20, stylus arm 40 returns under the influence of spring 48 to its initial position.

At the beginning of the next operation ring 70 is pulled, thus drawing string 68 out of the device and controlling the winding up of spring 60 on capstan 62. During the windup, yoke 24, 26 remains in the position shown in FIG. 4 since the drawing out of the string pulls the various units on shaft 38 against base 20. When ring 70 is released (FIG. 5) there is no longer a tension force in the string tending to bias shaft 38 toward base 20. At this time spring 54 causes yoke 24, 26 to be raised to the playing position. Between playing operations the record cylinder is held in the non-playing position and the stylus arm is in its initial position out of contact with the record cylinder. This insures that accidental jostling of the doll in which the audio mechanism is incorporated will not result in scratching of the record cylinder.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. An audio device comprising record means having sound grooves thereon, means for mounting said record means in the audio device, means for rotating said record means, speaker means, a stylus arm for engaging said speaker means and having a stylus mounted thereon adapted to follow the grooves on said record means while said record means rotates, cylindrical pivot mounting means, said stylus arm having at an end opposite to said stylus a hole with a diameter larger than the diameter of said cylindrical pivot mounting means and two parallel planar surfaces separated by an amount equal to the diameter of said cylindrical pivot mounting means, said cylindrical pivot mounting means extending through said stylus arm hole between said planar surfaces whereby angular movement of said stylus arm relative to the longitudinal axis of said cylindrical pivot mounting means is permitted while twisting of said stylus arm with respect to said cylindrical pivot mounting means is prevented, said stylus arm further having at said opposite end pointed projections facing away from said speaker means for bearing against said cylindrical pivot mounting means and an arcuate surface facing said speaker means, and spring means mounted on said cylindrical pivot mounting means for exerting a force against the arcuate surface on said stylus arm.

2. An audio device in accordance with claim 1 wherein said record means is a record cylinder and said record mounting means includes a rotatable arbor for supporting a record cylinder insertable thereon.

3. An audio device in accordance with claim 1 wherein said spring means is further operative to bias said stylus arm toward the starting end of said record means.

4. An audio device in accordance with claim 1 wherein said record rotating means includes a spring-receiving capstan, a spring mounted to said spring-receiving capstan, and a pull string connected to said spring-receiving capstan for winding said spring on said capstan responsive to the withdrawal of said pull string from the audio device, the release of said pull string being operative to enable said spring to unwind for rotating said record means during playing intervals.

5. An audio device in accordance with claim 4 further including a clutch mechanism for controlling the rotation of said record means responsive to the rotation of said spring-receiving capstan only when said spring unwinds during playing intervals.

6. An audio device in accordance with claim 4 further including governor means for regulating the speed of rotation of said record means during playing intervals.

7. An audio device in accordance with claim 1 further including means for biasing said record means toward said speaker means against said stylus and means attached to the free end of said pull string for limiting the drawing of said pull string into the audio device to enable said spring to overcome said biasing means between playing intervals to maintain said record means in a position away from said speaker means in non-engagement with said stylus.

8. An audio device in accordance with claim 7 further including a string-receiving pulley coaxial with said spring-receiving capstan, said pull string and said spring being wound in opposite directions on said string-receiving pulley and said spring-receiving capstan respectively such that the winding up of said spring or said string is accompanied by an unwinding of said string or said spring respectively.

9. An audio device in accordance with claim 8 further including a yoke, a shaft mounted on said yoke, said spring-receiving capstan, said string-receiving pulley and said record means being mounted on said shaft, and pivot means connected to said yoke at one end thereof for enabling pivotal movement of said yoke thereabout, said record biasing means being connected to the other end of said yoke for pivoting said yoke about said pivot means to urge said record means into engagement with said stylus.

References Cited

UNITED STATES PATENTS

| | | | |
|---|---|---|---|
| 1,979,067 | 10/1934 | Franklin | 274—1 |
| 2,034,888 | 3/1936 | Wilhelm | 274—1 |
| 3,033,336 | 5/1962 | Kinsman | 192—41 |
| 3,082,006 | 3/1963 | Ryan | 274—1 XR |
| 3,235,266 | 2/1966 | Scoparino | 274—1 XR |
| 3,370,855 | 2/1968 | Lindsay | 274—1 |

LEONARD FORMAN, Primary Examiner

ROGER A. FIELDS, Assistant Examiner